UNITED STATES PATENT OFFICE.

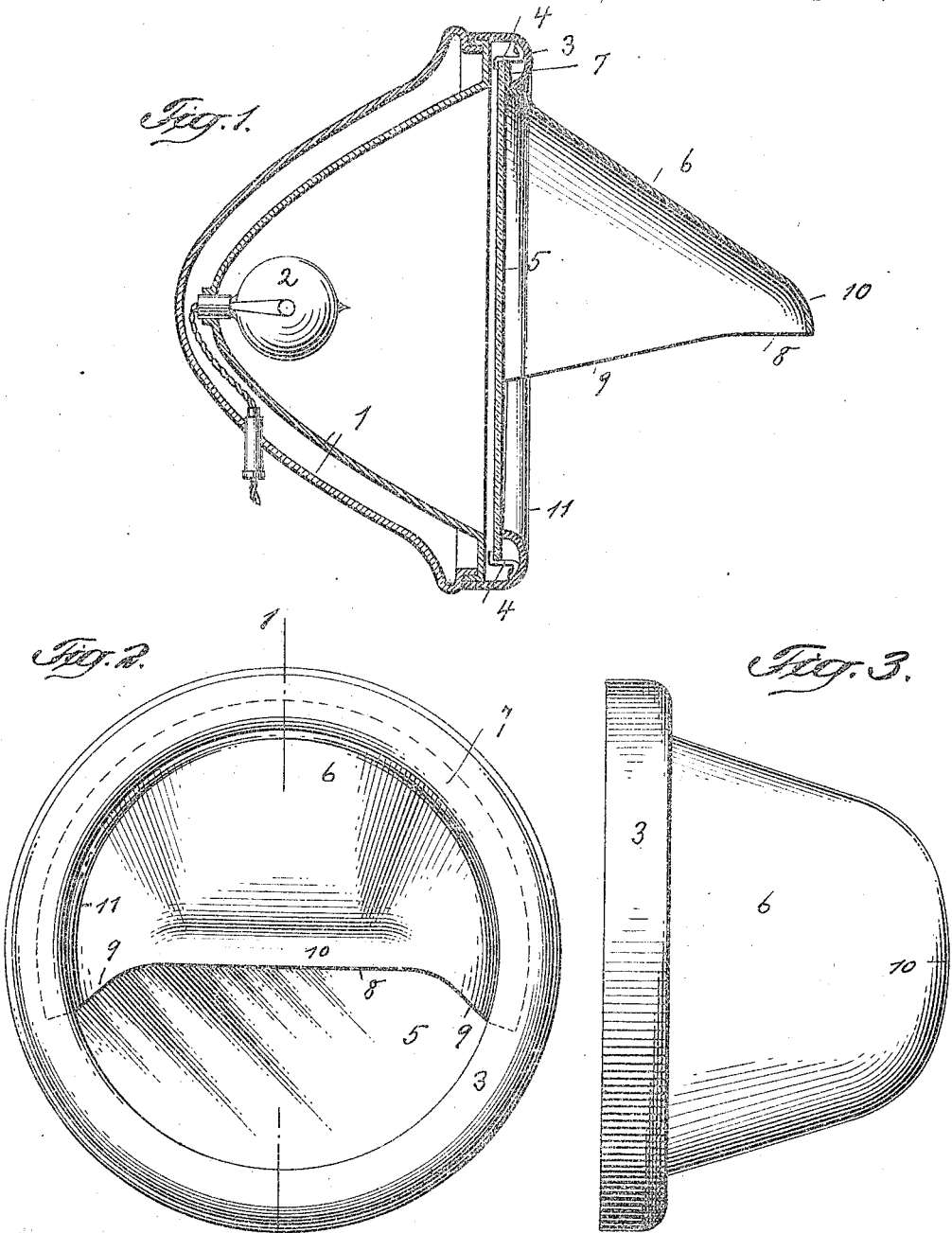

MINNA VATTER, OF BROOKLYN, NEW YORK.

AUTOMOBILE-LAMP.

1,180,746.	Specification of Letters Patent.	Patented Apr. 25, 1916.

Application filed December 15, 1915. Serial No. 66,9.

*To all whom it may concern:*

Be it known that I, MINNA VATTER, a citizen of the United States, and a resident of Brooklyn, in the county of Kings and State of New York, have invented certain new and useful Improvements in Automobile-Lamps, of which the following is a specification.

This invention relates to an automobile lamp which is so constructed that its light will be directed downward to illuminate the road bed, and will be prevented from being flashed into the faces of operators of approaching cars or of pedestrians.

In the accompanying drawing: Figure 1 is a longitudinal section of an automobile lamp embodying my invention on line 1—1 Fig. 2; Fig. 2 is a front view, and Fig. 3 is a top view of the ring and shade.

Within casing 1 of the lamp, is centered the electric light bulb 2, the casing being furnished with a ring 3, having catches 4, that engage the window 5. From the casing constructed as described, there extends forwardly, a shade 6 having a flange 7, that projects between ring 3 and window 5 and is likewise engaged by the catches 4. The shade tapers from the rear toward the front, and extends forwardly from the upper half of the lamp body, leaving the lower half of such body unobstructed. At its front the shade is provided with a short lower horizontal edge 8, which is substantially aligned with the center of casing 1 and consequently of bulb 2. From the rear end of the horizontal edge 8, the sides of the shade assume a downward slope as at 9, so that the back of the shade as well as its flange 7, exceeds a semi-circle in span. In this way, there is formed at the front of the shade a nose 10, which intercepts the upper light rays, while the rear of the shade cannot be dislodged from the ring, as would be the case, were its span limited to a semi-circle or less. Paralleling flange 7, the shade is provided with a bead 11 that bears against ring 3 near the inner edge thereof, and serves to exclude draft and to tighten the connection between ring and shade.

In use, the upper light rays on striking the inclined body of the shade will be reflected downwardly, and will by the nose, be prevented from radiating forwardly, so that the road bed will be thoroughly illuminated, while all objectionable glare or upward diffusion of the light is effectively prevented. The shade may be easily applied to automobiles by removing the ring, placing the shade with its flange against the window, and then re-attaching the ring.

I claim:

An automobile lamp comprising a casing, a ring engaging the same, a window engaged by the ring, and a forwardly projecting shade the lower edge of which extends first horizontally and then downward, so that the back of the shade exceeds a semi-circle in span, a flange formed on the rear portion of the shade, and likewise engaged by the ring, and a bead formed on the shade parallel to the flange and adapted to bear against the ring near the inner edge thereof, whereby a weather tight connection is formed between the shade and ring.

MINNA VATTER.